United States Patent [19]

Kalafus

[11] Patent Number: 4,684,949
[45] Date of Patent: Aug. 4, 1987

[54] VHF/RADAR TRANSPONDER COLLISION AVOIDANCE AID

[75] Inventor: Rudolph M. Kalafus, Newton, Mass.

[73] Assignee: The United States of America as represented by the Secretary of Transportation, Washington, D.C.

[21] Appl. No.: 458,728

[22] Filed: Jan. 17, 1983

[51] Int. Cl.⁴ .............................................. G01S 13/93
[52] U.S. Cl. ....................................... 342/41; 342/42; 342/57
[58] Field of Search .............. 343/6 R, 6.5 LC, 6.5 R; 342/29, 30, 41-43, 57

[56] References Cited

U.S. PATENT DOCUMENTS 3,644,883  2/1972  Borman et al. ................. 343/6 R X
3,806,922  4/1974  Isbister ........................ 343/6.5 LC
4,104,629  8/1978  Isbister et al. ...................... 343/6 R Primary Examiner—Thomas H. Tarcza
Assistant Examiner—Mark Hellner
Attorney, Agent, or Firm—Otto M. Wildensteiner

[57] ABSTRACT

A radiotelephone and a radar transponder are interconnected in such a manner as to establish a VHF communications link via the radiotelephone in response to interrogation of the radar transponder. The radar transponder will ordinarily be periodically enabled and will transmit a code which partially identifies the transmission source in response to interrogation when enabled. The radiotelephone will also be periodically enabled so as to transmit a more complete identifying code and requests and coded information received via the VHF communications link will be decoded and displayed.

8 Claims, 1 Drawing Figure

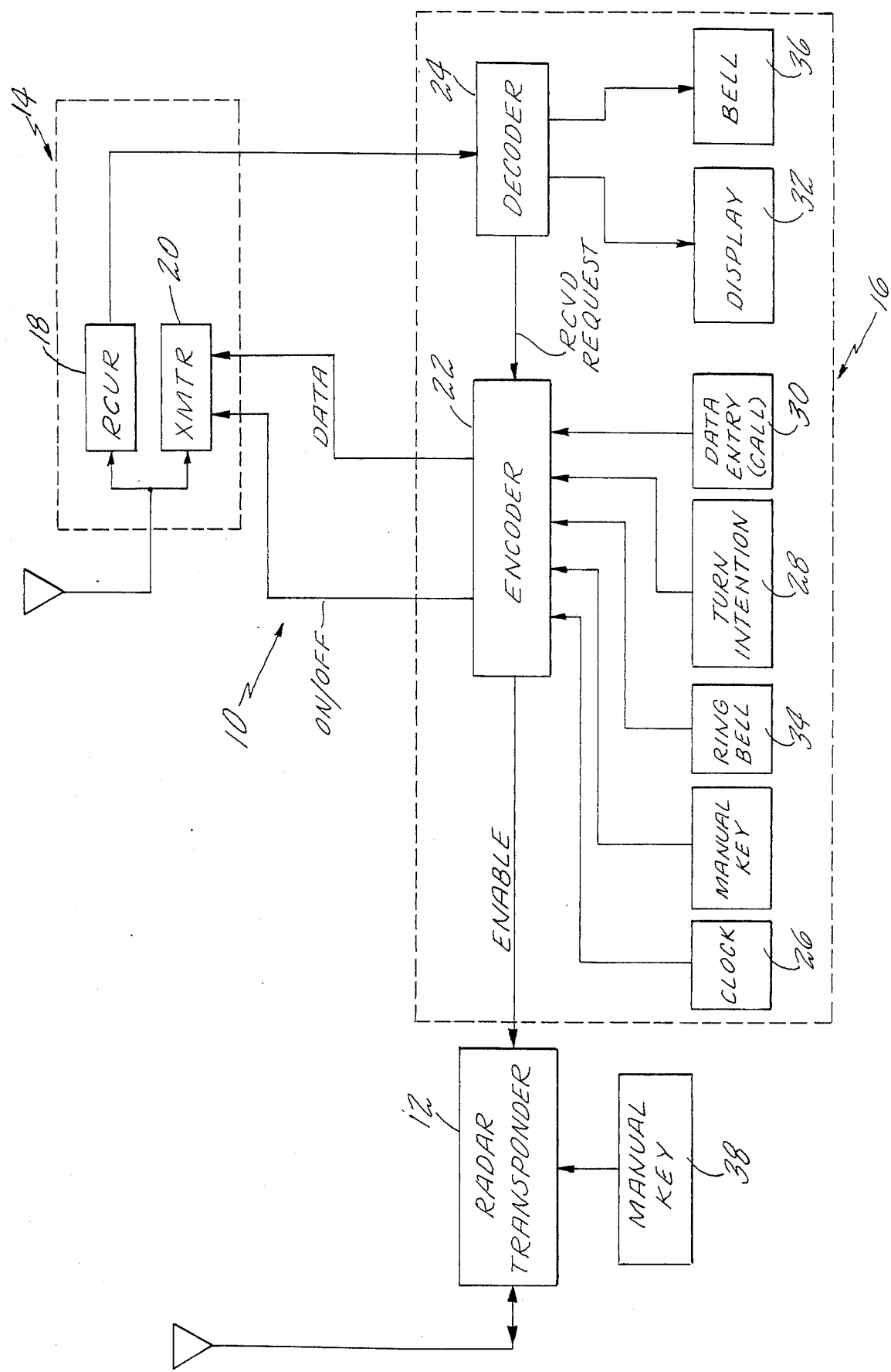

VHF/RADAR TRANSPONDER COLLISION AVOIDANCE AID

The above-identified invention relates to a comparatively inexpensive proximity warning device particularly well-suited for use on ships. Apparatus in accordance with the invention comprises a coupling system which interconnects a radar transponder with a VHF radiotelephone so as to permit establishment of a radio-linkage with a vessel which has been detected by the keying of its radar transponder.

The establishment of verbal communications between marine vessels operating in the same waters, whereby maneuvers may be coordinated, would greatly reduce the possibility of collision. At the present time the establishment of verbal communication is difficult since nearby vessels, detected by the keying of their radar transponders, cannot be identified so that they may be specifically called. The present invention overcomes this problem by coupling a radar transponder, indicated in the drawing at 12, with a VHF radiotelephone 14 by means of an interconnection electronics package 16. The basic elements of the interconnection system are a clock 26, encoder 22, decoder 24 and display 32. The system operates by periodically enabling the radar transponder and simultaneously transmitting, via modulation of the radiotelephone carrier, the vessel's own identification. The modulation of the VHF carrier is of short duration and thus does not interfere with voice communication via the radiotelephone. Coded identification signals received from other vessels are demodulated and the identification information displayed. The system has the capability of transmitting specific requests which, when received and decoded, will be acted upon to, for example, enable the radar transponder on a vessel identified by its unique identification code. Thus, the system includes means for operator entry of information to be encoded and subsequently modulated on the VHF carrier and this information will include the identification of a nearby vessel and a request that some specific action be performed at that vessel such as, for example, the enabling of its radar transponder, the ringing of its bell or the initiation of voice communication via the radiotelephone.

Novelty is believed to reside in the concept of interconnecting a VHF radiotelephone and a radar transponder, both of which are systems known in the prior art, so as to provide an inexpensive collision avoidance aid. Novelty is also believed to reside in the specific manner in which this interconnection is accomplished.

BACKGROUND OF THE INVENTION (1) Field of the Invention

The present invention relates to the provision of a warning of the proximity of a second vehicle to the operator of a first vehicle and particularly to the avoidance of collisions between marine vessels. Specifically, the present invention is directed to a communications system which interconnects a radar transponder with a VHF radiotelephone so as to establish a radio-linkage with a vessel which has been detected by the keying of its radar transponder. Accordingly, the general objects of the present invention are to provide novel and improved methods and apparatus of such character.

(2) Description of the Prior Art

While not limited thereto in its utility, the present invention is particularly well suited for use on marine vessels. Accordingly, this invention will be described below in the environment of a proximity warning system for ships. At the present time most commercial vessels carry a radar and a VHF radiotelephone. The conventional radar systems, even the most sophisticated, detect only the presence and course of a nearby vessel. Any other information must be obtained by establishing verbal communication with the other vessel. This is usually a difficult task since there is no way of first establishing the identification of the other vessel so that it can specifically be called so as, for example, to coordinate maneuvers. In crowded ports the establishment of voice communication between vessels is made even more difficult by the number of vessels.

Many collisions which have occurred in the past could have been avoided if verbal communication had been established between the vessels in time. In crowded ports the amount of time required to establish verbal communication between vessels becomes extremely important. Obviously, enhancing the ability to communicate with nearby vessels, and particularly minimizing the time required to establish such communication, will minimize the chances of collision.

SUMMARY OF THE PRESENT INVENTION

The present invention overcomes the above-briefly discussed and other deficiencies and disadvantages of the prior art by coupling a vessel's onboard radar transponder to a standard VHF radiotelephone. This coupling system enables the transmission of an identifying code from the transponder in response to a received interrogating X-band radar signal from another vessel. The system also establishes a radio-linkage between the two vessels which allows for the exchange of identification and maneuvering information.

A coupling system in accordance with the invention comprises an electronics package which initiates the transmission of a specific coded response from the transponder. The coupling system also establishes a radio-linkage with an interrogating or interrogated vessel. In this way nearby ships are placed in radio communication with each other and may exchange digitally coded information over the VHF radiotelephone.

In its most basic form, the present invention enables the transponder periodically or manually, subsequently initiates the transponder in response to a received interrogating radar signal and establishes a VHF radio-link. This allows the masters of individual vessels to communicate verbally. In accordance with the preferred embodiment, the coupling system of the invention incorporates data processing capabilities which allows the tracking of plural vessels. Additionally, the preferred embodiment of the invention permits non-verbal communication of maneuvering intentions. It is also within the capabilities of the invention to track plural vessels and communicate with only those vessels posing the greater danger of collision while ignoring others. This is especially useful in crowded harbors.

The present invention, by coupling a radar transponder and VHF radiotelephone, establishes communication promptly between two approaching vessels and thus reduces the possibility of collision. Also, the transmission of data over a VHF channel reduces interference at radar frequencies thus facilitating tracking of vessels by radar. It should also be noted that, by utilizing prior art transponders and VHF radiotelephones, the overall cost of the proximity warning system is reduced.

BRIEF DESCRIPTION OF THE DRAWING

The present invention may be better understood and its numerous objects and advantages will become apparent to those skilled in the art by reference to the accompanying drawing which is a functional block diagram of a preferred embodiment of the present invention.

DESCRIPTION OF THE PREFERRED EMBODIMENT

Referring to the drawing, the present invention is shown as a collision avoidance system for marine vessels which couples a vessel's radar transponder to its VHF radiotelephone. The coupling electronics package may be comprised of various known electronics subsystems to achieve the desired communication capabilities. This coupling electronics package may include a microprocessor and data storage capabilities. The system may utilize various types of data display devices.

A system according to a preferred embodiment of the invention is indicated generally at 10. System 10 is comprised generally of a radar transponder 12, a VHF radiotelephone 14 and a coupling electronics package 16. Transponder 12 and radiotelephone 14 are conventional hardware carried by many commercial marine vessels. An important attribute of the present invention resides in the fact that the only modification needed to implement the system on most commercial vessels is the installation of the coupling electronics and, in some cases, a radar transponder with antenna.

Transponder 12 comprises a receiver-transmitter unit which operates in conjunction with a scanning radar device. The transponder 12, if enabled, is activated upon the reception of a signal in the radar frequency band. When activated (interrogated), transponder 12 transmits a signal at a second predetermined frequency. Both the interrogation and reply frequencies are selected so that the overall system is compatible with similar systems aboard other vessels. Typically, transponder 12 will be activated by an X-band radar interrogating range in the frequency of 9320–9500 MHz. Transponder 12 will have the capability of responding with a rapid swept-frequency signal with a coded signal, an elaborately coded response not being necessary in the case of the present invention.

In order to insure that the transmitted signal from transponder 12 is received by the interrogating radar, it is preferable to provide a rapid swept-frequency burst of 2–6 sweeps. This assures that all radars within range receive the signal. The number of sweeps can be varied according to a predetermined code which may, for example, indicate vessel size and weight. The radar screen of the interrogating system will translate the number of sweeps into a series of dots spaced radially outwardly from the center of the screen. The dot most closely positioned to the center of the screen will be juxtapositioned to the blip corresponding to the interrogated ship, i.e., the source of the coded response. In this fashion the master viewing the radar screen will have some information concerning the transmitting ship. Other transmitting frequency bands may be selected with the only requirement being that the operational frequency band be selected so tht most, if not all, radar sets will be receptive.

It should also be noted that transponder 12 will be receptive to an interrogating signal for only comparatively short periods of time which, for example, will last for three seconds. Additionally, the time periods when transponder 12 will be enabled will occur at any of a predetermined time interval in the range of two or ten minutes, by manual action or by request by another vessel. While transponder 12 may be enabled for shorter or longer time intervals, three seconds is preferable in order to assure that even the slowest scanning radar will have enough time to interrogate transponder 12. The enabling time sequence is controlled by a strobe circuit within transponder 12, which functions as a three second clock, and an external clock. As mentioned above, and as will be discussed further below, transponder 12 may also be keyed manually or automatically in response to a signal received by radiotelephone 14.

Radiotelephone 14 is a conventional device presently used aboard most marine vessels for audio communication. The general components of radiotelephone 14 are VHF receiver 18 and transmitter 20. The signal transmitted by radiotelephone 11 is preferably modulated, under control of the coupling electronics 16, by a tone or tones having a frequency ranging between 2000–10,000 KHz. While the choice of modulation is not crucial to the functioning of the present invention, it is preferable to use a two-frequency modulation technique corresponding to the binary number system which allows for the incorporation of data processing capabilities. It should further be noted that while tone modulation is preferable, any technique whereby information may be superimposed on the VHF carrier frequency is suitable. As will be discussed below, the transmitted coded signal constitutes an information containing signal which may include a request, i.e., activation of transponder, maneuver intention, being made to another vessel. Thus it is indispensable that the transmitting technique used be uniform in order to allow communication between different vessels.

System 10 is controlled by the coupling electronics 16 which couples radiotelephone 14 to transponder 12. Coupling system 16 is generally responsible for initiating and interpreting the coded signal transmitted and received by radiotelephone 14, respectively. Thus circuit 16 may be comprised of available subsystems capable of handling the data signal coding and decoding required by the present invention. Circuit 16 is also responsible for activating transponder 12 when a request for transponder keying is received from another vessel.

Circuit 16 is generally comprised of an encoder 22 and a decoder 24 which are interconnected with each other and connected to the radiotelephone 14. Encoder 22, which is additionally connected to transponder 12, receives input signals from the decoder and various other electronic devices or circuits. These encoder input signals control system response and determine the information to be modulated on the VHF carrier frequency. For illustrative purposes only, the input devices and circuits may include a clock 26, maneuver intention signaler 28 and a call button on a data entry panel 30. The encoder 22 translates these signals into the desired transmitting code, preferably one compatible with the binary system. Encoder 22 supplies the coded signal to the modulator of transmitter 20 of radiotelephone 14 for transmission.

Any signal received by radiotelephone 14 is, after demodulation, delivered to decoder 24. Decoder 24 translates any coded information contained in the signal and delivers a control signal to the appropriate component of system 10 to initiate the desired activity. The system is also provided with a display device 32 which is connected to decoder 24. Display 32 may be merely a printer or may be a more sophisticated data storage and display device. The display device 32 allows the visual reading of information received from another vessel such as, for example, the other vessel's identification, and its maneuvering intentions.

As noted above, the transponder 12 is enabled for three seconds with there being a predetermined time interval between those periods when the transponder is enabled. In the example being given, the time interval, as established by clock 26 of the coupling electronics 16, is three minutes. Thus, the enabling of transponder 12 is controlled by a clock 26 which is connected to encoder 22. Encoder 22 will supply a gating signal to the three second strobe in transponder 12 when it receives a timing pulse from clock 26.

The operation of system 10 will now be described. As noted above, transponder 12 will normally be enabled for three seconds every three minutes. This will allow an interrogating X-band radar, if one is present, to activate transponder 12. The transponder, when interrogated, will respond and the response will include the coded information which will enable partial, i.e., size or weight, identification of the vessel. The radiotelephone 14 will also be activated in response to the output of clock 26 and will thus, in the example being described, transmit its own ship's identification code every three minutes. The transmission of the coded own ship's identification via the radiotelephone may also be manually commanded. All ships within range, and equipped with the coupling electronics of the present invention, will decode the identification and this identification will be presented on the display 32. The display will also preferably record the time at which a nearby ship identified itself via the radiotelephone link. It is within the capabilities of the present invention to include circuitry which will delete from the display, if an active display such as a CRT is employed, the identification of all vessels that have not identified themselves within a predetermined time interval such as, for example, twenty minutes. It is to be noted that the amount of time needed to transmit the data via the VHF channel is typically less than 0.1 seconds and thus the data transmission will not interfere with normal voice communication on the radiotelephone link. Additionally, the shortness of the data transmission minimizes the possibility of interference between similar transmissions of different vessels.

In order to permit precise location, on the radar screen, of a nearby vessel, the data impressed on the VHF carrier frequency may include the identification of a vessel that has recently transmitted its identification code and a request that that vessel allow its transponder to be interrogated. This transponder interrogation request will be decoded and, via the encoder, applied as an enabling signal to the three second strobe in the transponder. Since the transponder enabling request is addressed to a particular vessel, the returns on the radar screen of the interrogating vessel will absolutely identify the interrogated ship. It is also to be noted that the transponder may be manually enabled by control 38. This allows two vessels in VHF radio contact to identify each other on their respective radar screens by announcing their transponder keyings.

The data modulated on the VHF carrier may include a request provided by a command signal generator 34, for the other ship's bell 36 to ring. This is a "direct-dial" capability which facilitates contact between vessel masters, a particular problem in the case of river traffic and in crowded harbor areas. The request for the ship's bell to ring will be presented on the display adjacent to the identification of the requesting vessel and will alert the master of the interrogated vessel that voice communication is desired and identify the vessel desiring such communication.

The information modulated on the VHF carrier of the radiotelephone may also, along with the ship's identification code, include a coded signal commensurate with the vessel's maneuver intention. This maneuver intention information may also be displayed thereby alerting nearby ships to expect a maneuver.

An optional feature of the present invention includes the capability of automatically requesting a verbal transmission of the name of an interrogated vessel. Such a "voice" transmission could be produced by activating a voice synthesizer or tape loop which would be utilized as the input to the modulator of the VHF transmitter. The verbal transmission, requested and automatically answered, has the advantage that it will give the interrogated ship's full name rather than the limited part of the name available to a display.

To briefly further discuss the display, which would most conveniently be located adjacent to the ship's radar, as noted above the display device may take a variety of forms. At the minimum, the display will comprise an alpha-numeric presentation including the first seven to ten letters of the name of the ship last heard on the VHF frequency. This information could be printed out by means of a teletypewriter and, if a display comprised a digital memory, the names of a plurality of vessels could be stored. The "names" of the stored vessels could, employing a digital memory, be circulated until the name of a desired ship appeared whereupon, by keying an interrogation (call) button, a command or request could be sent selectively to that particular ship. If the names are listed by a printer, the operator will have to employ a key pad or similar device 30, associated with the call button, to input the identification code of the nearby vessel of interest. As also noted above, the display will preferably have the capability of indicating any maneuver intent signaled by another ship.

It is also within the capabilities of the present invention to use the data modulation of the VHF carrier to transmit Loran-C coordinates or latitude-longitude coordinates. This information would allow a vessel master to plot the track of another vessel and would also allow a computer to calculate proximity, closing rate, closest point of approach and time to closest point of approach.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A communications system comprising:
   radar transponder means;
   radio transceiver means comprising a VHF radiotelephone; and
   means operatively coupling said transponder and transceiver means, said coupling means comprising:
   clock means, said clock means generating timing signals;

means responsive to said clock means generated timing signals for periodically enabling said transponder means and said transceiver means;

modulator means, said modulator means delivering a coded identification signal to said transceiver means for transmission upon the enabling thereof;

decoder means, said decoder means demodulating coded information bearing signals received by said transceiver means;

display means connected to said decoder means for displaying identification information received by said transceiver means; and encoder means, said encoder means being manually operable to generate desired request signals, said encoder means being connected to said modulator means whereby coded requests can be transmitted to a transceiver whose identification is displayed by said display means.

2. The apparatus of claim 1 wherein said transceiver means comprises:

a radiotelephone including a receiver and transmitter.

3. The apparatus of claim 2 wherein said transponder means includes an internal clock whereby said transponder means, when enabled by said enabling means, will transmit a signal having preselected characteristics when interrogated by a similar remotely located transponder.

4. The apparatus of claim 3 including encoder means responsive to the reception from a remote transceiver of the identification signal provided by said modulator means and a transponder enable request signal for enabling said transponder means.

5. The apparatus of claim 4 further comprising:

annunciator means, said annunciator means being energized by an output provided by said decoder means in response to said decoder means receiving an identification signal commensurate with that provided by said modulator means and an annunciator activation request signal provided by the encoder means of a remotely located coupling means.

6. The apparatus of claim 3 wherein said encoder means includes:

data entry means for providing signals commensurate with a selected receiver identification signal and requests; and means responsive to the signals provided by said data entry means for generating binary coded signals for application to said modulator means.

7. The apparatus of claim 6 including encoder means responsive to the reception from a remote transceiver of the identification signal provided by said modulator means and a transponder enable request signal for enabling said transponder means.

8. The apparatus of claim 7 further comprising:

annunciator means, said annunciator means being energized by an output provided by said decoder means in response to said decoder means receiving an identification signal commensurate with that provided by said modulator means and an annunciator activation request signal provided by the encoder means of a remotely located coupling means.

* * * * *